United States Patent [19]

Ting et al.

[11] 4,229,335

[45] Oct. 21, 1980

[54] AQUEOUS DISPERSION OF POLYAMINO POLYHYDROXY POLYETHER RESINOUS ADDUCT AND ACID-FUNCTIONAL AMINOPLAST FOR CATHODIC ELECTROCOATING

[75] Inventors: Vincent W. Ting, Brunswick, Ohio; James M. Evans, Lynn Haven, Fla.

[73] Assignee: SCM Corporation, Cleveland, Ohio

[21] Appl. No.: 20,529

[22] Filed: Mar. 14, 1979

Related U.S. Application Data

[62] Division of Ser. No. 874,809, Feb. 3, 1978, Pat. No. 4,159,233.

[51] Int. Cl.$^3$ .............................................. C08L 61/28
[52] U.S. Cl. ........................... 260/29.4 R; 204/181 C; 260/29.2 EP
[58] Field of Search .................. 260/29.4 R, 29.2 EP; 204/181 C; 525/510

[56] References Cited

U.S. PATENT DOCUMENTS

| | | | |
|---|---|---|---|
| 4,066,525 | 1/1978 | Woo et al. | 204/181 C |
| 4,093,594 | 6/1978 | Anderson | 260/47 EP |
| 4,134,864 | 1/1979 | Belanger | 260/18 EP |
| 4,137,140 | 1/1979 | Belanger | 204/181 C |

*Primary Examiner*—Theodore E. Pertilla

*Attorney, Agent, or Firm*—Joseph M. Hageman; Merton H. Douthitt

[57] ABSTRACT

An acid-solubilized aqueous dispersion particularly suitable for use in the cathodic electrocoating art and stable up to pH of about 9 comprises the product of reacting substantially all of the epoxide groups of a polyether diepoxide with from about 1.25 to 2 moles of a polyamine having from 2 to 5 amine groups to form a precursor adduct and subsequently reacting this precursor adduct with about 0.2 to 2 moles of a mono-epoxide having a hydrolysis-resistant normal alkyl group of at least 4 carbon atoms to form a substantially epoxy-free polyamino polyhydroxy polyether resinous adduct, a sufficient proportion of the amine groups of said polyamine being primary or secondary to provide an amino hydrogen for reaction with every epoxide group of both the diepoxide and the mono-epoxide, and about 0.05 to 0.4 weight parts (per part of the resinous adduct) of an aminoplast resin having at least about one gram-equivalent of carboxylic acid groups with $pK_a$ from about 2 to 6 per 1,000 grams of aminoplast resin for catalyzing heat-induced curing of the resin mixture. The coatings cathodically electrodeposited from such dispersions exhibit superior corrosion and detergent resistance when cured at moderate temperatures.

9 Claims, No Drawings

AQUEOUS DISPERSION OF POLYAMINO POLYHYDROXY POLYETHER RESINOUS ADDUCT AND ACID-FUNCTIONAL AMINOPLAST FOR CATHODIC ELECTROCOATING

This is a division, of application Ser. No. 874,809, filed Feb. 3, 1978 U.S. Pat. No. 4,159,233, issued June 26, 1979.

BACKGROUND OF THE INVENTION

In the cathodic electrocoating art, dispersions (usually aqueous) containing cationic resins are formed from resins having either salt groups with separable anions or groups ionizable to form cations by reaction with a suitable ionizing species (usually an acid) present in the dispersion medium. The cationic resins for cathodic electrocoating usually have either protonated amine groups or quaternary ammonium ions as their cations. The ionization of these cationic resins, together with the presence of water-soluble counter-anions, stabilizes the dispersion of these resins and they in turn can act as dispersing agents for other non-ionized coating components such as other resins, cross-linking agents, pigments, etc. The cationically dispersed components are attracted to a conductive substrate in contact with the dispersion when that substrate is charged as a cathode and are deposited thereon by at least partial electrical discharge of the cationic resin at the surface of the substrate-cathode.

Cationic resin dispersions suitable for cathodic electrocoating have been based on a variety of resin types, including aminated epoxy resins formed by reaction of polyamines with epoxy resins and dispersed in aqueous medium by ionization with a variety of water-soluble acids. Thus U.S. Pat. No. 3,963,663 (Sekmakas) teaches adding cationic groups to urethane-epoxy resins by reaction of the epoxy functionality with diprimary amines to give a mixture of primary and secondary amine groups for ionization with water-soluble acid; phenoplast resins are shown as cross-linkers and aminoplast resins are specifically contra-indicated for cathodic electrocoating use (cf. column 3, lines 57 to 68). (In an earlier patent, U.S. Pat. No. 3,891,527, Sekmakas disclosed use in cathodic electrocoating of aqueous cationic dispersions of aminated epoxy-urethane-ether resins formed by exhaustive amination of the epoxy functionality of diepoxide-urethane-ether resins with mono-secondary amines, optionally codispersed with aminoplast resin curing agent and also optionally having carboxylic acid groups on the aminated epoxy-urethane-ether resin.) U.S. Pat. No. 3,947,339 (Jerabek et al) discloses cathodic electrocoating compositions comprising self-curing resins which have primary amine groups attached by reaction of a polyamine having both a secondary amine group and also ketimine-blocked latent primary amine groups (liberated upon dispersion in aqueous medium) with epoxy resins having both blocked isocyanate groups and hydroxyl groups, the resulting resin being dispersed in water by at least partial ionization of the amine groups with a water-soluble acid. U.S. Pat. No. 2,772,248 (Lieberman et al) discloses aminated epoxy resins which are reaction products of epoxy resin with a polyamine containing two or more primary or secondary amine groups and are soluble in aqueous acids, but neither electrocoating use nor inclusion of a cross-linker is suggested.

Aminoplast resins are well known as curing agents for resins having active hydrogens. Both U.S. Pat. No. 3,471,388 (Koral) and U.S. Pat. No. 3,894,993 (Blanks) disclose cathodic electrocoating compositions which contain polyamine-aminated epoxy resins having both primary and secondary amine groups and also comprising etherified formaldehyde-aminotriazine adducts as curing agents, but neither suggests having carboxylic acid groups associated with the aminoplast resin for catalyzing cure. U.S. Pat. No. 3,519,627 (Coats et al) discloses etherified benzoguanamine- or melamine-formaldehyde adducts having aliphatic carboxylic acid groups for use as curing agents with anionic resins in anodic electrocoating compositions, the carboxylic acid functionality of the aminoplast being described only as aiding in the codeposition of the aminoplast on the anode-substrate; there is no suggestion of any use with cationic resins or in particular in cathodic electrocoating.

SUMMARY OF THE INVENTION

The present invention is a dispersion suitable for use in the cathodic electrocoating art and comprising: (a) an aqueous medium having pH from about 3 to 9 and containing an acid with a $pK_a$ not greater than about 5; (b) a substantially epoxy-free, non-gelled, resinous adduct of (i) a substantially epoxy-free precursor adduct of a polyether diepoxide having molecular weight from about 300 to 10,000 and a polyamine having molecular weight from about 60 to 600 and (ii) a mono-epoxide having molecular weight from about 100 to 500 and having a normal alkyl group of at least about 4 carbon atoms pendant through only hydrolysis-resistant linkages from the epoxy group of said mono-epoxide, the mole ratio of residues of said mono-epoxide to residues of said diepoxide in said resinous adduct being from about 0.2:1 to 2:1, the mole ratio of residues of said polyamine to residues of said diepoxide in said resinous adduct being from about 1.25:1 to 2:1, and said polyamine having from 2 to 5 amine groups per molecule and at least sufficient amino hydrogens to react with substantially all of the epoxy groups of both said diepoxide and said mono-epoxide; and (c) from about 0.05 to 0.4 weight parts, per weight part of said resinous adduct, of an aminoplast resin having at least about 1 gram-equivalent, per 1,000 grams of said aminoplast resin, of carboxylic acid groups with $pK_a$ from about 2 to 6 for catalyzing the heat-induced cure of said resinous adduct with said aminoplast resin.

The invention further comprises a process for forming a cured resinous coating on a conductive substrate comprising (A) establishing concurrent contact of said conductive substrate and of another electrode with a common body of liquid aqueous dispersion according to the immediately preceding description; (B) maintaining a net unidirectional electrical current through said body of aqueous dispersion between said conductive substrate as cathode and said other electrode as anode to electrodeposit upon accessible portions of said conductive substrate a film comprising an intimate mixture of said resinous adduct and said aminoplast resin; (C) removing said conductive substrate coated with said film from contact with said body of dispersion; and (D) thereafter heating said film on said substrates to cure said film by the acid-catalyzed reaction of said aminoplast resin with said resinous adduct.

DESCRIPTION OF PREFERRED EMBODIMENTS

The polyamino polyhydroxy polyether resinous adduct of the present invention can be made by first reacting together any substantially linear diepoxide-terminated polyether resin having molecular weight from about 300 to 10,000 and a polyamine having from 2 to 5 amine groups and molecular weight from about 60 to 600 to substantial exhaustion of epoxy functionality to form a precursor adduct and subsequently reacting this precursor adduct with suitable mono-epoxide, again to substantial exhaustion of epoxy functionality, to form the desired resinous adduct. The mole ratio of mono-epoxide to diepoxide residues in the resinous adduct product should be from about 0.2:1 to 2:1 and the mole ratio of polyamine to diepoxide residues should be about 1.25:1 to 2:1, the polyamine having at least sufficient amino hydrogens to react with all of the epoxy groups of both the diepoxide and the mono-epoxide. Preferably excess polyamine will be present during the reaction of diepoxide with polyamine and most or all of that excess will be removed from the reaction mixture before the monoepoxide is added. These reactions may be conducted either without added solvent or in a suitable solvent such as an aromatic hydrocarbon or an alkylene ether alcohol.

The amination of epoxy groups is a well-known reaction which proceeds easily with only moderate heating and without added catalyst being required. Primary amine groups are sufficiently more reactive than other amine groups with epoxy groups, that primary amine groups will be substantially exhausted before any secondary amine groups, either initially present or formed by prior reaction of primary amine groups, will react to a significant extent. Tertiary amine groups may be present in the polyamine reactant to contribute to the solubilization of the product resin, but they may tend to catalyze other undesired epoxide reactions if higher temperatures than required for the epoxide amination reaction are reached. The presence of quaternary ammonium groups in the resinous adduct should usually be avoided.

Preferred resinous adducts can be made by amination of conventional linear polyether diepoxide resins which are themselves diglycidyl ether-terminated polyether condensation products of a glycol or bisphenol with an epihalohydrin to form the requisite precursor adducts. Particularly preferred are adducts derived from linear polyether diepoxides which in turn are derived from alkylene bisphenols such as bisphenol-F and especially bisphenol-A.

A wide variety of polyamines can be used in preparing the polyamino polyhydroxy polyether resins. They may be aliphatic, aromatic, or heterocyclic, or may be a combination or mixture of types so long as they have about 2 to 5 amine groups per molecule and include at least a sufficient proportion of amino hydrogens to react with all of the epoxy groups of both the diepoxide and the mono-epoxide reactants to be incorporated into the polyamino polyhydroxy polyether resinous adduct. Polyalkyleneamines such as ethylenediamine, diethylenetriamine, etc., are suitable for preparation of the aminated resins of this invention. If it is desired to increase the proportion of primary amine groups in the product resin using a particular polyamine reactant having primary amine groups and a particular ratio of polyamine to diepoxide, a suitable proportion of the primary amine groups may be blocked (e.g. by prior reaction with a ketone to form ketimine groups) so as to prevent the preferential reaction of those primary amine groups with the epoxide groups, the amination then involving either unblocked primary amine groups or secondary amine groups of the blocked polyamine reactant. Aliphatic diamines are preferred as polyamine reactants, a particularly suitable example being dimethylaminopropylamine. An example of a suitable heterocyclic polyamine is N-methylpiperazine. Aromatic polyamines, while useful as reactants in preparing the polyamine-aminated resins of this invention, are less preferred than the aliphatic or heterocyclic diamines.

It is sometimes desired that the polyamino polyhydroxy polyether resinous adduct of this invention be substantially free of primary amine groups. This can be accomplished by providing not more than one primary amine group in the polyamine reactant. Where a stoichiometric excess of epoxide equivalents is provided, over and above that required to react with all of the primary amine groups (if any) of the polyamine reactant, the amination reaction should be continued so as to exhaust the epoxide functionality by reaction with secondary amine groups either initially present in the polyamine reactant or formed by prior epoxide reaction with primary amine groups.

In order to insure that substantially all the epoxide groups of the polyether diepoxide reactant used in preparing the precursor adduct are aminated, a stoichiometric excess of the polyamine reactant, typically about 10 percent excess, may be provided. It is also the usual practice to add the diepoxide reactant to a stirred reactor vessel containing the polyamine reactant to insure so far as practicable that a local excess of reactive amine functionality prevails for each epoxide group so as to minimize the occurrence of epoxide reactions other than amination, many of which are catalyzed by tertiary amine groups which may be present in the polyamine reactant or formed during the amination reaction. As much as practicable of any residual unreacted polyamine should be separated from the reaction mixture by distillation or otherwise before the mono-epoxide is added.

It is preferred that the resinous adduct have at least one normal alkyl group of at least about 4 carbon atoms in order to enhance the flow and leveling of the electrodeposited coating so as to improve the degree and uniformity of coverage of the substrate surface and thereby its protection in use. It is particularly preferred that such pendant alkyl groups be linked to amino groups of the resinous adduct through only hydrolysis-resistant linkages. This may be conveniently accomplished by reacting a suitable mono-epoxide, such as an alkyl mono-epoxide or the monoglycidyl ester of a tertiary carboxylic acid, with a primary or secondary amine group of the precursor adduct reaction product described above, provision having been made for such post-reaction in selecting the polyamine reactant for reaction with the diepoxide so as to insure that an adequate number of reactive amine equivalents are present in the precursor adduct. The amination reaction of the mono-epoxide with the precursor adduct should also be carried to exhaustion of the epoxy functionality and preferably by gradual addition of the mono-epoxide to the reaction mixture. The monoepoxide reactant must have a normal alkyl group of at least 4 carbon atoms pendant through only hydrolysis-resistant linkages from the epoxy group in order to incorporate the desired hydrolysis-resistant alkyl group in the resinous adduct.

The acid-functional aminoplast resin may be selected from the conventional types of aminoplast resins well known as curing agents for resins having active hydrogens, such as the hydroxyl hydrogens of the resinous adducts of the present invention, provided the type of aminoplast selected is modified so as to have carboxylic acid groups which can act as cure catalysts in the deposited coating film. The most preferred types of aminoplast resins are fully etherified melamine- or benzoguanamineformaldehyde adducts. The required carboxylic acid groups can be incorporaed by reacting a hydroxy acid to form an ether linkage during etherification of such adduct. Normally other conventional ether-forming hydroxy-functional materials, such as lower alkanols and alkylene ether- or polyalkylene polyether-alcohols, will also be reacted with the amino-aldehyde adduct, the relative proportions being selected so as to achieve the desired proportion of carboxyl groups. While almost any hydroxy carboxylic acid may be used for this purpose, aromatic carboxylic acids, such as salicyclic acid, are preferred. The hydroxy acid may be reacted with a terminal hydroxyl group pendant from the amine-aldehyde adduct by way of an alkylene ether or polyalkylene ether linkage. The preparation of acid-functional etherified amine-aldehyde adducts is described in U.S. Pat. Nos. 4,066,525 (Woo et al), 4,026,855 (Parekh et al), 3,502,557 (Yurcheshen et al), and 3,519,627 (Coats et al), all incorporated herein by reference.

Almost any acid sufficiently strong to ionize amine groups on the polyamino polyhydroxy polyether resinous adduct can be employed as the neutralizing acid. Since an acid with $pK_a$ of about 5 or less will ionize a significant proportion of most amine groups, most carboxylic organic acids will produce a satisfactory degree of ionization of the resinous adduct, but it is usually more convenient if the acid selected is itself at least moderately soluble in water and it is frequently desirable that the acid be relatively voltile so that any portion thereof deposited as part of the uncured film will tend to fugitive upon heating the film to effect cure. Lactic acid is a particularly preferred acid, but many other organic carboxylic acids may be used. Inorganic acids, such as hydrochloric, sulfuric and phosphoric, may also be used, but are usually less preferred.

The amount of acid used will depend upon the pH which is found to give satisfactory dispersions with any particular combination of components, within the range from about 3 to 9. It is usually advantageous to operate the coating bath at as high a pH as possible to reduce the corrosiveness of the environment in which the equipment functions, so long as the dispersion remains reasonably stable by having a sufficient degree of ionization of the polyamine-aminated resinous adduct.

The coating bath dispersion may usefully contain from about 5 to 25 percent solids by weight, but about 10 to 15 percent is more usual and preferred. Concentrated dispersions for initial preparation of the coating bath by dilution or for replenishment of a partially depleted bath may contain as much as about 50 percent solids.

The dispersions of this invention are particularly useful in the cathodic electrocoating art. Their primary use in that art is as the bath in which the articles to be coated are at least partially immersed and from which the coating film is deposited. When used as such a bath, the dispersions may comprise only the acid-containing aqueous medium, the polyamino polyhydroxy polyether resinous adduct and the acid-functional aminoplast resin. They may also, however, contain so-solvents, such as alcohols or ether-alcohols, to improve the stability of the dispersion and to facilitate flow-out of the electrodeposited coating film before it is cured. Other conventional components which may be present include anti-foam agents, etc.

Usually it will also be desired to incorporate pigments in the bath dispersion so that a pigmented coating may be produced therefrom. For this purpose, virtually any of the pigments (and especially corrosion inhibiting pigments), extenders, flatting agents, etc., and mixtures thereof known in the art may be used. Such pigments, etc., can be incorporated by the conventional procedure of first preparing a concentrated pigment paste or "grind" by mixing the pigments with a suitable liquid vehicle under sufficiently intense shearing to produce a fine and uniform dispersion of the pigment mixture in this vehicle and then diluting or "letting down" this paste or grind by mixing in additional liquid vehicle using relatively mild agitation. It is particularly advantageous in the present invention if both the grind vehicle and the let-down vehicle comprise the polyamino polyhydroxy polyether resinous adduct dispersed in acid-containing aqueous medium; the acid-functional aminoplast resin may be incorporated with either or both of these vehicles, but will usually be added only as part of the let-down vehicle.

Other suitable resinous components may also be incorporated as part of the total vehicle resin. One particularly preferred composition utilizes a dispersion of a polyamino polyhydroxy polyether resinous adduct as hereinbefore described as the grind vehicle and a dispersion of a hydroxyalkyl monoamine-aminated polyhydroxy polyether resin as described in U.S. Pat. No. 4,066,525, issued Jan. 4, 1978 and incorporated herein by reference, as the let-down vehicle resin. The proportion of the acid-functional aminoplast incorporated in such a composition should be sufficient to cross-link both of the aminated resins during thermal cure of the electrodeposited resinous film.

Since in operating an electrocoating bath over an extended period to coat a substantial total surface area of substrate, some of the components of the bath are usually deposited at a faster rate in proportion to their concentration in the bath than are other components, in replenishing the bath to replace components depleted by prior operation thereof it is necessary that the replenishment or make-up composition reflect this disproportionate depletion so as to maintain the composition of the bath dispersion itself as nearly constant as practicable. Thus it is usually desirable that a make-up composition comprise an aqueous dispersion containing the same components as the bath, but in different proportions and in particular containing as little water and solubilizing acid as possibly consistent with stability of the concentrated make-up dispersion. Such make-up compositions are broadly contemplated as being included within the scope of the present invention.

EXAMPLE I

A suitable polyamino polyhydroxy polyether resinous adduct may be prepared from a low molecular weight diepoxide derived from bisphenol-A and epichlorohydrin by reaction with dimethylaminopropylamine (DMAPA) and then with an alkyl monoepoxide.

224 weight parts of DMAPA (2.2 mole parts) are mixed with 11 weight parts of xylene and heated to reflux under an inert atmosphere. To this mixture is gradually added over a period of about two hours 1,050 weight parts of Dow epoxy resin DER-661 (1 mole part) dissolved in 350 weight parts of xylene while maintaining reflux. The reflux is continued for about two additional hours or as long as necessary to consume substantially of all the oxirane functionality of the epoxy resin. The temperature of the mixture is then gradually raised to about 365° F. while removing xylene and excess amine as distillate. Most of the residual solvent and unreacted DMAPA is removed from the mixture by applying vacuum of about 24 inches of mercury while maintaining the temperature at about 365° F. until the distillation rate is nil. Then the temperature is lowered to about 300° F. and maintained at that temperature while 130 weight parts (0.5 mole parts) of a 16 carbon atom α-olefin epoxide (Union Carbide) is gradually added over a period of about one hour and at least for an additional 30 minutes so that the mono-epoxide will fully react with the aminated precursor adduct. Finally, 784 weight parts of 2-butoxy ethanol is stirred in. The product solution is about 62 percent by weight non-volatiles and the resinous adduct produced has base number of about 132, corresponding to a mole ratio of DMAPA to diepoxide in the product resinous adduct of about 1.57:1.

EXAMPLE II

A similar procedure as in Example I, but using only 65 weight parts (0.25 parts) of the α-olefin epoxide, produces a similar resinous adduct wth fewer flexibilizing pendant alkyl groups. A mole ratio of DMAPA to diepoxide residues incorporated in the product was found to be 1.52 from a measured base number of 134.5.

EXAMPLE III

A greater proportion of flexibilizing groups is provided by using 260 weight parts (1 mole part) of the α-olefin epoxide in the same procedure. A mole ratio of DMAPA to diepoxide residues in the product of about 1.61 was determined from the base number of 122.4.

EXAMPLE IV

The resinous adducts prepared in Example I are employed to formulate a suitable pigment grind for a cathodic electrocoating composition as follows. About 17.9 weight parts of that product (11.1 parts of resin solids in 2-butoxyethanol) are mixed with 1.8 additional parts 2-butoxyethanol, 1.1 parts 2-hexoxyethanol, 41.8 parts water and 1.5 parts lactic acid to form an aqueous pigment grinding vehicle. This vehicle is then mixed in conventional high shear pigment grinding apparatus, such as a sand mill, with 28.1 parts rutile $TiO_2$, 10.8 parts clay, 0.5 parts carbon black and 0.5 parts Surfynol 104 wetting agent until the pigment is well dispersed.

The same procedure is used to make pigment pastes from the resinous adducts of Examples II and III.

EXAMPLE V

A mono-amine aminated binder resin of the type described in U.S. Pat. No. 4,066,525 can be prepared for use in a let-down vehicle for combination with a resinous polyamino polyhydroxy polyether adduct of the type described hereinabove in the grind vehicle as follows. Charge to a suitable reactor vessel 96.4 weight parts of diethanol amine and heat to about 130° C. Over a period of about two hours at 857.2 parts of a 75% solution in xylene of a low molecular weight diepoxide-functional epoxy resin derived from bisphenol-A and epichlorohydrin, such as the Dow Chemical Company product designated DER-671 which has a molecular weight of about 1,050, while maintaining the temperature of the reaction mixture at approximately 130° C. under reflux. The above reaction conditions are maintained for about an additional hour, at which time 60.6 parts of nonyl phenol are added over a period of about 10 minutes and these same reaction conditions are maintained until the epoxide (oxirane) number is reduced to about zero, which normally requires about two to three hours. While the temperature is gradually raised to about 160° C. over a period of about one to two hours, about 190 parts xylene are removed from the reaction mixture by distillation under vacuum. The temperature of the reaction mixture is then lowered to about 125° C. and there is added 395.4 parts of an approximately 85% solution in isobutanol of an acid-functional aminoplast resin such as an American Cyanamid Corporation product designated Cymel 1141 which is a substantially fully etherified hexamethylol melamine etherified with a lower alkanol and a hydroxy aromatic carboxylic acid and has an Acid Number of about 19.6. This reaction mixture is maintained at about 115° C. under reflux for about one hour, at which time 233.2 parts of 2-ethoxyethanol are added and the mixture is cooled to room temperature. This resin solution is about 78.5% by weight non-volatiles, has an Acid Number (based on non-volatiles) of about 4.28 and, after dilution with an equal volume of 2-ethoxyethanol, has a viscosity of G on the Gardner-Holt scale.

An amount of this solution containing about 147 weight parts of non-volatiles is mixed with 15 parts of 2-hexoxyethanol, 15 parts lactic acid and 227 parts water to form a let-down vehicle dispersion.

EXAMPLE VI

A let-down vehicle dispersion is made from each of the resinous adducts prepared in Examples I to III by mixing an amount of those solutions containing 104 weight parts of resinous adduct with 15 parts of 2-hexoxyethanol, 15 parts of lactic acid, 277 parts water and about 50 parts Cymel 1141 acid-functional aminoplast (corresponding to about 43 parts non-volatiles).

EXAMPLE VII

An aqueous dispersion suitable for cathodic electrocoating is formulated from each of the pigment paste dispersions of Example IV, in combination with the let-down vehicle dispersion of Example VI which uses the same polyamino polyhydroxy polyether resinous adduct, by mixing 496 weight parts of the let-down dispersion with 104 parts of the pigment grind dispersion and 1,200 parts of water. These final dispersions have about 11.5% nonvolatiles by weight.

EXAMPLE VIII

Other dispersions suitable for cathodic electrocoating are formulated as in Example VII, except that in each case the let-down vehicle dispersion of Example V is used in place of the corresponding dispersion from Example VI.

EXAMPLE IX

Resinous films are deposited on steel panels immersed in each of the cathodic electrocoating dispersions of Examples VII and VIII by causing a net electrical current flow between those immersed panels and a counter-electrode also in contact with the dispersion in response to an applied voltage of about 100 volts for about two minutes, with the panel being coated as cathode. The panels so coated are removed from the dispersion, washed with water, baked for about 20 minutes in a 375° F. oven and allowed to cool. All panels exhibit excellent resistance to corrosion when tested in either salt spray or in detergent solutions.

EXAMPLE X

A different resinous adduct may be prepared using the procedure set forth in Example I above, but substituting in place of the DMAPA 198 weight parts of N-(aminoethyl)ethanolamine (1.9 mole parts) and reducing the amount of the α-olefin epoxide to 80.5 weight parts (0.31 mole parts). The amount of 2-butoxy ethanol solvent added is adjusted to give a non-volatile proportion of 62%, the same as in Example I. The base number of the product was found to be 122.4, which corresponds to a mole ratio of diamine to diepoxide in the product resinous adduct of about 1.39:1.

A pigment grind and a let-down vehicle are made from this resinous adduct by the procedures of Examples IV and VI, respectively, and these in turn are combined to form a suitable aqueous dispersion for cathodic electrocoating according to the procedure of Example VII above. Resinous films are deposited from this dispersion and baked to form cured resinous coatings according to the procedure of Example IX above. The steel panels so coated exhibited excellent resistance to corrosion upon exposure to either salt spray or detergent solution.

What is claimed is:

1. A liquid aqueous dispersion suitable for use in cathodic electrocoating art and comprising:
    (A) an aqueous medium having pH from about 3 to 9 and containing an acid with a $pK_a$ not greater than about 5;
    (B) a substantially oxirane-free, non-gelled, resinous adduct of
        (i) a substantially oxirane-free precursor adduct of a polyether diepoxide having molecular weight from about 300 to 10,000 and a polyamine having molecular weight from about 60 to 600 and
        (ii) a mono-epoxide having molecular weight from about 100 to 500 and having a normal alkyl group of at least about 4 carbon atoms pendant through only hydrolysis-resistant linkages from the epoxy group of said mono-epoxide,
        the mole ratio of residues of said mono-epoxide to residues of said diepoxide in said resinous adduct being from about 0.2:1 to 2:1, the mole ratio of residues of said polyamine to residues of said diepoxide in said resinous adduct being from about 1.25:1 to 2:1, and said polyamine having from 2 to 5 amine groups per molecule and at least sufficient amino hydrogens to react with substantially all of the epoxy groups of both said diepoxide and said mono-epoxide; and
    (C) from about 0.05 to 0.4 weight parts, per weight part of said resinous adduct, of an aminoplast resin having at least about 1 gram-equivalent, per 1,000 grams of said aminoplast resin, of carboxylic acid groups with $pK_a$ from about 2 to 6 for catalyzing the heat-induced cure of said resinous adduct with said aminoplast resin.

2. A dispersion according to claim 1 wherein said polyamine has only one primary or secondary amine group.

3. A dispersion according to claim 2 wherein said polyamine is a diamine.

4. A dispersion according to claim 1 wherein said diepoxide is a diglycidyl ether of an alkylene bisphenol or of an alternating alkylene bisphenol-glycerol polyether.

5. A dispersion according to claim 4 wherein said polyamine is dimethylaminopropyl amine and said alkylene bisphenol is bisphenol-A.

6. A dispersion according to claim 1 wherein a pigment is mixed into part or all of said oxirane-free, non-gelled, resinous adduct.

7. A dispersion according to claim 1 wherein said aqueous dispersion also contains an additional resin similarly cured by said aminoplast resin.

8. A dispersion according to claim 7 wherein a pigment is mixed into part or all of said additional resin and/or said resinous adduct.

9. A dispersion according to claim 8 wherein a pigment is mixed into part or all of said resinous adduct and said additional resin is a hydroxyalkyl monoamine-aminated polyhydroxy polyether resin.

* * * * *

UNITED STATES PATENT AND TRADEMARK OFFICE
CERTIFICATE OF CORRECTION

PATENT NO. : 4,229,335
DATED : Oct. 21, 1980
INVENTOR(S) : Vincent W. Ting and James M. Evans It is certified that error appears in the above-identified patent and that said Letters Patent are hereby corrected as shown below:

Col. 2, l. 11:  ":" should read "-".

Col. 2, l. 66:  Please remove the "s" from substrate so that it will read "substrate".

Col. 5, l. 13:  "incorporaed" should read --incorporated--.

Col. 6, l. 5 :  "so-solvents" should read --co-solvents--.

Signed and Sealed this

Thirteenth Day of January 1981

[SEAL]

Attest:

SIDNEY A. DIAMOND

Attesting Officer

Commissioner of Patents and Trademarks